(12) United States Patent
Esposito et al.

(10) Patent No.: US 9,967,707 B2
(45) Date of Patent: May 8, 2018

(54) WEATHER DATA DISSEMINATION

(71) Applicant: Honeywell International Inc., Morristown, NJ (US)

(72) Inventors: Carl Esposito, Phoenix, AZ (US); Kenneth R. Jongsma, Albuquerque, NM (US); Willard R. True, Kirkland, WA (US)

(73) Assignee: Honeywell International Inc., Morris Plains, NJ (US)

( * ) Notice: Subject to any disclaimer, the term of this patent is extended or adjusted under 35 U.S.C. 154(b) by 0 days. days.

(21) Appl. No.: 14/254,317

(22) Filed: Apr. 16, 2014

(65) Prior Publication Data
US 2015/0304813 A1    Oct. 22, 2015

(51) Int. Cl.
*H04W 4/02* (2009.01)
*G01W 1/08* (2006.01)
*H04B 7/155* (2006.01)
*G01S 13/95* (2006.01)
*G08G 5/00* (2006.01)
*G01S 7/00* (2006.01)

(52) U.S. Cl.
CPC ............ *H04W 4/023* (2013.01); *G01S 7/003* (2013.01); *G01S 13/951* (2013.01); *G01S 13/953* (2013.01); *G01W 1/08* (2013.01); *G08G 5/0013* (2013.01); *G08G 5/0026* (2013.01); *G08G 5/0078* (2013.01); *G08G 5/0082* (2013.01); *G08G 5/0086* (2013.01); *G08G 5/0091* (2013.01); *H04B 7/155* (2013.01)

(58) Field of Classification Search
CPC .............................. H04W 4/023; H04B 7/155
See application file for complete search history.

(56) References Cited

U.S. PATENT DOCUMENTS

| 5,265,024 | A | 11/1993 | Crabill et al. |
| 5,530,909 | A | 6/1996 | Simon et al. |
| 5,657,009 | A | 8/1997 | Gordon |
| 6,014,606 | A | 1/2000 | Tu |

(Continued)

FOREIGN PATENT DOCUMENTS

| CN | 103512562 A | 1/2014 |
| EP | 2290636 A1 | 3/2011 |

(Continued)

OTHER PUBLICATIONS

"The Garmin Marine Network, The Ultimate in Onboard Navigation Solutions," Garmin International Inc., retrieved from http://www8.garmin.com/marine/brochures/06542_MRN-_network_brochure_v2.pdf on Feb. 5, 2015, 20 pp.

(Continued)

*Primary Examiner* — Chuong A Ngo
(74) *Attorney, Agent, or Firm* — Shumaker & Sieffert, P.A.

(57) ABSTRACT

In some examples, a first entity is configured to request weather data for a region of interest from a second entity. The second entity may transmit the requested weather data to the first entity in response to receiving the request. In some examples, the second entity only transmits the weather data to the first entity only in response to receiving a specific request for the weather data. Conversely, the first entity may only receive the weather data from the second entity in response to transmitting a request for the weather data.

18 Claims, 5 Drawing Sheets

(56) References Cited

U.S. PATENT DOCUMENTS

| | | | |
|---|---|---|---|
| 6,043,756 A | 3/2000 | Bateman et al. | |
| 6,441,773 B1 | 8/2002 | Kelly et al. | |
| 6,448,922 B1 | 9/2002 | Kelly | |
| 6,501,392 B2 | 12/2002 | Gremmert et al. | |
| 6,536,272 B1 | 3/2003 | Houston et al. | |
| 6,720,920 B2 | 4/2004 | Breed et al. | |
| 6,721,559 B1 | 4/2004 | Kocin et al. | |
| 6,828,922 B1 | 12/2004 | Gremmert et al. | |
| 6,977,608 B1 | 12/2005 | Anderson et al. | |
| 7,047,114 B1 | 5/2006 | Rogers | |
| 7,069,147 B2 | 6/2006 | Manfred et al. | |
| 7,084,775 B1 | 8/2006 | Smith | |
| 7,302,493 B1 | 11/2007 | Alles et al. | |
| 7,365,673 B2 | 4/2008 | Makkapati et al. | |
| 7,365,675 B2 | 4/2008 | Pearlman et al. | |
| 7,406,382 B2 | 7/2008 | Brulle-Drews | |
| 7,474,250 B2 | 1/2009 | Makkapati et al. | |
| 7,633,428 B1 | 12/2009 | McCusker et al. | |
| 7,633,430 B1 | 12/2009 | Wichgers et al. | |
| 7,817,078 B2 | 10/2010 | Bunch | |
| 8,022,859 B2 | 9/2011 | Bunch et al. | |
| 8,054,214 B2 | 11/2011 | Bunch | |
| 8,085,182 B2 | 12/2011 | Kauffman | |
| 8,130,121 B2 | 3/2012 | Smith et al. | |
| 8,144,048 B2 | 3/2012 | Bunch et al. | |
| 8,180,507 B2 | 5/2012 | Dokken | |
| 8,203,480 B1 | 6/2012 | Woodell et al. | |
| 8,217,828 B2 | 7/2012 | Kirk | |
| 8,223,062 B2 | 7/2012 | Bunch et al. | |
| 8,314,730 B1 | 11/2012 | Musiak et al. | |
| 8,332,087 B2 | 12/2012 | Yannacone, Jr. et al. | |
| 8,604,963 B1 | 12/2013 | Kronfeld et al. | |
| 8,629,788 B1 | 1/2014 | Greenleaf et al. | |
| 8,831,795 B2 | 9/2014 | Cabos | |
| 9,223,020 B1* | 12/2015 | Crosmer | G01S 13/951 |
| 9,256,004 B2 | 2/2016 | Agarwal et al. | |
| 9,535,158 B1 | 1/2017 | Breiholz et al. | |
| 2004/0244476 A1 | 12/2004 | Andrews et al. | |
| 2008/0035784 A1* | 2/2008 | Meserole et al. | 244/3.1 |
| 2008/0147257 A1 | 6/2008 | Kuhlgatz et al. | |
| 2008/0255714 A1 | 10/2008 | Ross | |
| 2010/0042275 A1 | 2/2010 | Kirk | |
| 2010/0144912 A1 | 6/2010 | Kawasumi et al. | |
| 2010/0245164 A1 | 9/2010 | Kauffman | |
| 2010/0332056 A1 | 12/2010 | Kirk | |
| 2011/0074624 A1 | 3/2011 | Bunch | |
| 2011/0161833 A1* | 6/2011 | Dheap et al. | 715/753 |
| 2012/0239285 A1 | 9/2012 | Oster | |
| 2013/0338920 A1 | 12/2013 | Pasken et al. | |
| 2015/0074191 A1 | 3/2015 | Feng et al. | |
| 2016/0070010 A1 | 3/2016 | Calupca et al. | |
| 2016/0182297 A1 | 6/2016 | Dauneria et al. | |

FOREIGN PATENT DOCUMENTS

| | | |
|---|---|---|
| EP | 2575120 A1 | 4/2013 |
| WO | 00013047 A1 | 3/2000 |
| WO | 2011019111 A1 | 2/2011 |

OTHER PUBLICATIONS

"Voluntary Observations from Mariners," NOAA National Weather Service, retrieved from http://www.nws.noaa.gov/om/marine/voluntary.htm on Feb. 5, 2015, 4 pp.

Extended Search Report from counterpart European Application No. 15162280.0, dated Oct. 9, 2015, 5 pp.

Response to Extended Search Report dated Oct. 9, 2015, from counterpart European Application No. 15162280.0, filed Mar. 29, 2016, 10 pp.

Chang et al., "Implementation of AIS-based Marine Meteorological Applications," Oceans 2014, IEEE, Apr. 7, 2014, 4 pp.

U.S. Appl. No. 15/220,201, naming inventors Wang et al., filed Jul. 26, 2016.

U.S. Appl. No. 14/687,799, naming inventors Esposito et al., filed Apr. 15, 2015.

\* cited by examiner

WEATHER DATA DISSEMINATION

TECHNICAL FIELD

The disclosure relates to weather information systems.

BACKGROUND

A detection and ranging system and other sensors onboard an airborne vehicle may be used to obtain weather information in an immediate environment of the system. For example, an on-board weather radar system may be configured to provide radar reflectivity data indicative of weather ahead of an aircraft within the range of a radar sensor of the system. The weather information can include, for example, information about a detectable weather phenomena, such as, but not limited to, convective weather cells, turbulence regions, clouds, precipitation, hail, snow, icing conditions, wind shear, and the like.

SUMMARY

This disclosure describes example devices, systems, and methods for requesting weather data for a region of interest from one or more entities, and example devices, systems, and methods for providing the weather data to one or more other entities. In some examples, a first entity is configured to request weather data for a region of interest from a second entity. The second entity may then transmit the requested weather data to the first entity in response to receiving the request. In some examples, the second entity only transmits the weather data to the first entity only in response to receiving a specific request for the weather data. Conversely, the first entity may only receive the weather data from the second entity in response to transmitting a request for the weather data. For example, the second entity may not transmit the weather data to any entities until it receives a specific request for weather data corresponding to a particular region of interest.

In some examples, the first entity is a ground-based system, while in other examples, the first entity is an air-based system (e.g., an aircraft). In some examples, the second entity is an air-based system that generates the weather data, while in other examples, the second entity is a ground-based system that receives the weather data from a third entity (e.g., an air-based system or a ground-based system). The entities can be air-based, water-based, ground-based, or any combination of air-based, water-based, and ground-based systems.

In some examples, the first entity may determine, based on a flight plan, that a first aircraft is going to be located in a specific region within a time period. The first entity may also determine a second aircraft that is near or in the specific region and request weather data from the second aircraft. The second aircraft, using onboard sensors, may collect weather data for the region. In response to receiving the request from the first entity, the second aircraft may transmit the weather data to the first entity. In some examples, the first entity is the first aircraft. In other examples, the first entity is a ground-based system, which may be configured to transmit the weather data to the first aircraft. In some examples, the weather data is geo-referenced weather data, which may indicate both a location for which the weather data indicates weather and a timestamp that indicates the time for which the weather data was generated.

In one example, a method comprises requesting, by a processor of a first entity, weather data corresponding to a region of interest from a second entity; and receiving, by the processor of the first entity, the weather data from the second entity, wherein the second entity only transmits the weather data to the first entity in response to receiving a request for the weather data from the first entity.

In another example, a system comprises a communications system; and a processor configured to transmit a request, via the communications system, for weather data corresponding to a region of interest from an entity, and receive, via the communications system, the weather data from the entity, wherein the processor only receives weather data from the entity in response to transmitting the request for the weather data.

In another example, a system comprises at least one sensor; a communications system; and a processor configured to receive a request, via the communications system, from a requesting entity, for weather data corresponding to a region of interest, and transmit, via the communications system, the weather data corresponding to the region of interest to the requesting entity, wherein the weather data is generated by the at least one sensor, wherein the processor is configured to transmit the weather data to the requesting entity only in response to receiving the request.

In another example, a system comprises means for requesting weather data corresponding to a region of interest from an aircraft, and means for receiving the weather data from the aircraft, wherein the aircraft only transmits the weather data to the entity in response to receiving a request for the weather data from the entity.

In another aspect, the disclosure is directed to an article of manufacture comprising a computer-readable storage medium. The computer-readable storage medium comprises computer-readable instructions for execution by a processor. The instructions cause the processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory that stores instructions (e.g., in the form of a computer program or other executable) to cause a processor to perform the techniques described herein, The computer-readable medium is non-transitory in some examples.

The details of one or more examples of the disclosure are set forth in the accompanying drawings and the description below. Other features, objects, and advantages will be apparent from the description and drawings, and from the claims.

DETAILED DESCRIPTION

Figure 1:
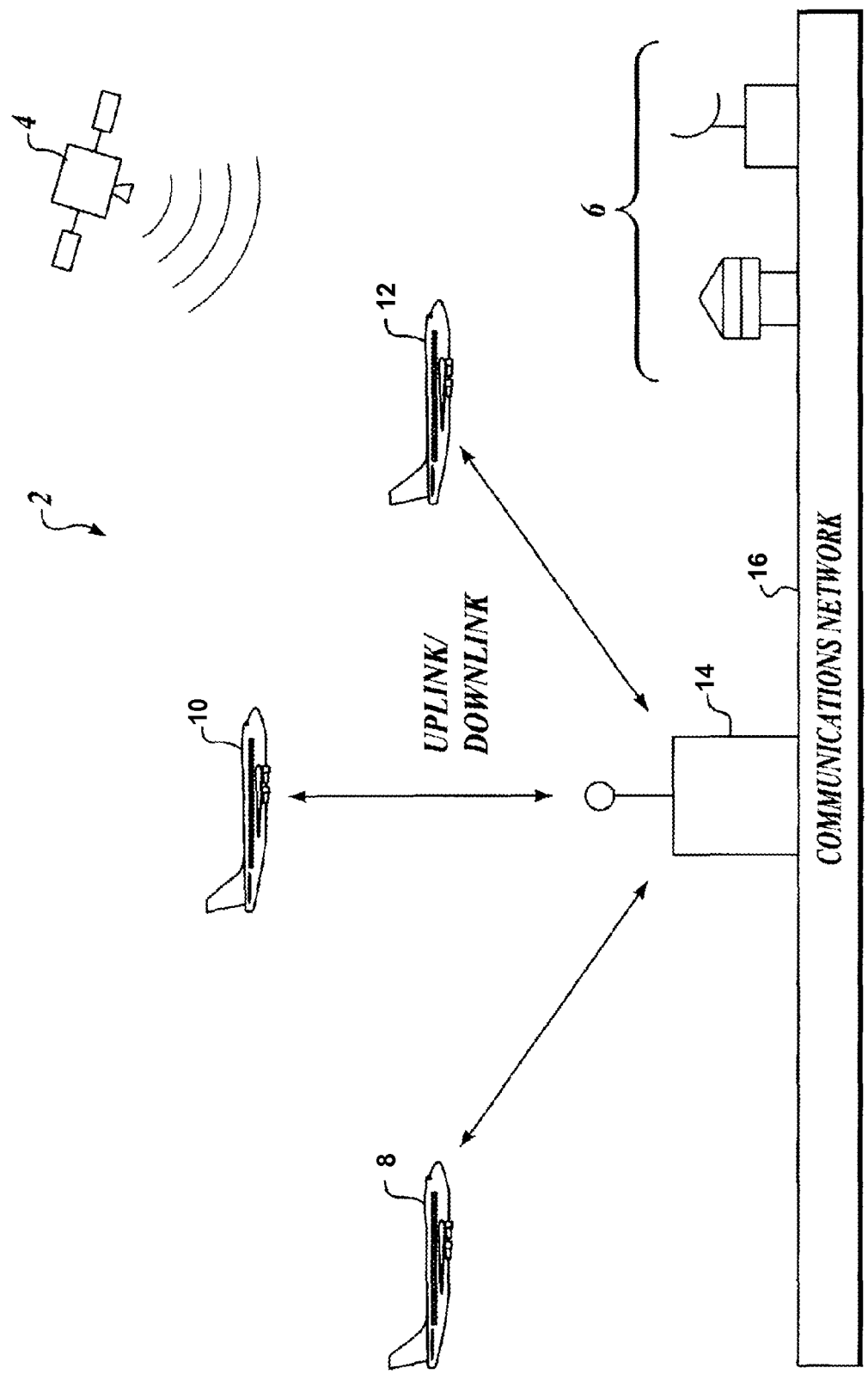
FIG. 1 is a conceptual diagram of an example weather data dissemination system.

This disclosure describes example devices, systems, and methods for disseminating and sharing weather data. In examples described herein, a requesting entity is configured to request weather data for a region of interest from one or more other entities, which may be one or more aircraft, one or more ground-based systems, one or more ground-based vehicles, one or more marine vessels, or a combination, and receive the weather data from the one or more entities. The one or more other entities can be, for example, entities that have generated the weather data for the region of interest (e.g., via onboard sensors), have received the weather data from another entity, combined generated and received weather data, or a combination of the foregoing. In this way, the receiving entity may obtain weather data that may otherwise be unavailable to it, e.g., due to limitations in the onboard weather systems. The weather data can include, for example, information relating to turbulence regions, clouds, precipitation, hail, snow, icing conditions, wind shear, temperature, convective weather cells, and the like.

By sharing weather data between entities in accordance with the techniques described herein, weather data from a plurality of entities may be accessed, as necessary, to acquire weather data relevant to an operation of a particular entity. In contrast to systems in which the one or more entities continuously provide weather data (e.g., generated by the respective entity) to an entity without a specific request for the weather data, the systems described herein may be more efficient, both in terms of use of resources of the entities providing the weather information and in terms of use of available bandwidth for transmission of the weather data. The efficiency may be particularly improved in systems in which the weather data receiving entity is an aircraft because, in some cases, datalinks used by aircraft may be relatively expensive to use and may have relative limited bandwidth. In some examples, an entity does not transmit any weather data to any other entities until it receives a specific request for weather data corresponding to a particular region of interest.

In some examples, after receiving the weather data from one or more other entities, the requesting entity provides the weather data to another entity, which can be an air-based system, a ground-based system, or a water-based system. In this way, the requesting entity can disseminate weather data to one or more other entities that may find the weather data useful. The requesting entity may, in some examples, combine weather data from a plurality of different sources, e.g., airborne sources, ground-based sources, or both, prior to transmitting the weather data to the other entity. Combining weather data from a plurality of sources may increase the robustness of the weather data.

In some examples, the entity providing the weather data may gather weather data within an environment around the entity or otherwise within range of sensors of the entity. Gathering weather data may be useful for the aircraft itself or may be provided to another entity (also referred to herein as a "receiving entity"), such as a ground station, another aircraft, or another vehicle. The weather data may be used by a processor at a receiving entity in many ways, such as, for example, to predict a convective weather cell, determine changes to weather, determine whether a weather cell has a potential for producing hail, determine flight paths, and the like. Convective weather cells may be, for example, an area in the atmosphere having a different density than the surrounding atmosphere and can be precipitating.

Ground-based systems may have an advantage over air-based systems when it comes to processing weather information. For example, relative to air-based systems, ground-based systems may be able to harness greater computational and storage resources that can analyze collected weather data from multiple sources. In some examples described herein, a ground-based system, such as a ground control station, may request weather data from one or more entities (e.g., one or more airborne vehicles, marine vessels, or ground-based systems). After receiving the weather data, the requesting ground-based system may uplink the weather data to a different aircraft that may have a use for that particular combined weather data.

In examples in which the ground-based system receives the weather data from one or more sources, the ground-based system may be configured to combine weather data from multiple sources and disseminate the combined weather data to other entities. While the remainder of the disclosure primarily refers to aircraft, the devices, systems, and techniques described herein may be used with other moveable platforms, such as, but not limited to, ground vehicles, marine vehicles, unmanned air vehicles, satellites, and the like.

FIG. 1 is a conceptual diagram of an example weather data dissemination system 2, which includes satellite 4, ground-based weather instrumentation 6, aircraft 8, 10, 12, ground station 14, and communications network 116. Ground station 14 is configured to collect weather data from a plurality of sources, which, in the example shown in FIG. 1, include satellite 4, ground-based weather instrumentation 6, aircraft 8, 10, 12. In other examples, ground station 14 can be configured to collect weather data from a subset of the sources shown in FIG. 1.

Satellite 4 is configured to generate weather data, such as, but not limited to, images of portions of Earth. Ground-based weather instrumentation 6 is configured to generate weather data indicative of weather within a sensor range of instrumentation 6. In some examples, ground-based weather instrumentation 6 includes one or more of: weather radar, local observations, or other Earth based sensors. Aircraft 8, 10, 12 are also each configured to generate weather data indicative of weather proximate the respective aircraft. The weather data generated by aircraft 8, 10, 12 can include, for example, data from one or more of: onboard weather radar systems, other onboard detection and ranging systems, lightening detectors, navigation systems, air data computers, and the like.

The type of weather data available to ground station 14, can, therefore, include, depending upon sensor availability, the following: (a) Convective activity (e.g., from Doppler radar measurements); (b) Turbulence (e.g., from Doppler radar measurement/downlinked acceleration data); (c) Winds aloft (e.g., from downlinked data from aircraft 8, 10, 14 or ground-based weather instrumentation 6); (d) High surface winds (e.g., from local measurements); (e) Icing conditions (e.g., from downlinked data and/or infrared measurements); (f) Precipitation density (e.g., from ground and airborne radar reflectivity data); (g) Lightning (e.g., from a lightening detector or other sensor); (h) Cloud density (e.g., from satellite imagery); (i) Volcanic Ash (e.g., from satellite imagery); and (j) direct pilot reports.

Ground station 14 is configured to receive the weather data from one of the sources 4, 6, 8, 10, 12 via downlink and/or via communications network 16. Communications network 16 may comprise any one or more of a fiber optic network, telephone system, interact, radio or cell phone link or any other suitable communications network.

In some examples, aircraft 8 transmits a request to ground station 14 for weather data from one or more other aircraft 10, 12, or transmits a request to ground station 14 for weather data for a particular region of interest. As described in further detail below, after receiving the request for weather data from aircraft 8, ground station 14 may request weather data from one or more aircraft 10, 12, e.g., in response to determining the particular aircraft 10, 12 is proximate a region of interest or can otherwise provide weather information relevant to the region of interest and a particular time range (to generate weather data relevant to aircraft 8). Ground station 14 may be in a better position than aircraft 8 to determine which aircraft can provide weather information relevant to the region of interest and a particular time range. In response to receiving the request for weather data, the one or more selected aircraft 10, 12 may transmit the weather data to ground station 14. Ground station 14 may uplink the received weather data to aircraft 8.

In other examples, ground station 14 may anticipate weather data that aircraft 8 may need or determine a region of interest for which weather data may be needed based on an operation of aircraft 8 (e.g., based on a flight plan of aircraft 8), and request the weather data from one or more entities 4, 6, 10, 12 that can provide the weather data that aircraft 8 may need or the weather data for the determined region of interest. Ground station 14 may then provide the received weather data to aircraft 8, even in the absence of a specific request from aircraft 8. For example, ground station 14 may determine, based on a known flight plan (or other planned flight route) of aircraft 8, that aircraft 8 is going to be in a particular region of interest during a particular time period. In response to making such a determination, ground station 14 may request weather data from one or more entities 4, 6, 10, 12 that can provide weather data relevant to the region of interest and particular time period. The weather data can be, for example, provided by aircraft 12 flying ahead of aircraft 8 in or near the region of interest at or near the altitude aircraft 8 is expected to be at in the region of interest.

In some examples, ground station 14 processes the received weather data received from the one or more entities 4, 6, 10, 12 prior to uplinking the weather data to aircraft 8. For example, ground station 14 may combine the weather data from multiple aircraft 10, 12., combine the weather data with weather data from other sources 4, 6, or both or combine the weather data with other data, such as pilot annotations, or any combination thereof. In some examples, in addition to collecting and combining weather data from a plurality of different entities 4, 6, 8, 10, 12, ground station 14 may also be configured to incorporate any available pilot reports (PIREPS) or other reported observations in addition to the weather data.

Aircraft 8 may include a system configured to receive the uplinked weather data from ground station 14 and display the weather data in a cockpit display, as described in further detail below, or in a mobile pilot or crew device, such as an electronic flight bag (EFB) or iPad tablet.

In some examples, ground station 14 only transmits weather data to entities that subscribe to a weather update service. For example, ground station 14 may transmit the weather data (requested by ground station 14 from one or more entities 4, 6, 8, 10, 12) to one or more entities (which can, in some cases, include the one or more entities 4, 6, 8, 10, 12 providing the weather data, or a subset of the weather data providing entities), even in the absence of specific requests for the weather data.

Figure 2:
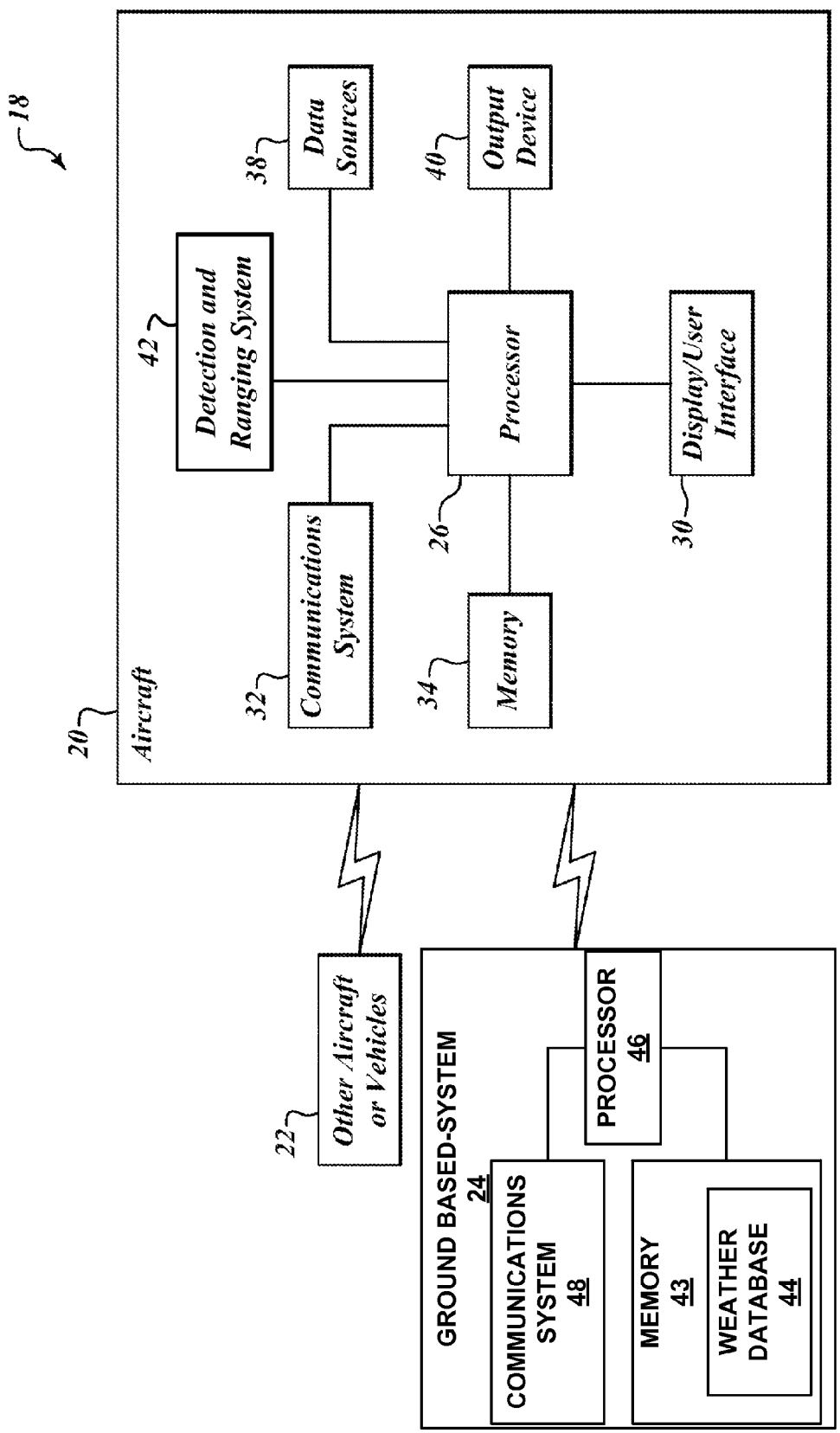
FIG. 2 is a block diagram illustrating an example weather data aggregating and dissemination system.

FIG. 2 is a block diagram illustrating an example weather data aggregating and dissemination system 18 (referred to herein as "system 18"), which is configured to combine weather data from one or more sources and disseminate the combined weather data. System 18 may be configured to provide the combined weather data in response to a request for the combined weather data from an entity, which can be one or more aircraft or other airborne vehicles or one or more ground-based systems, such as a ground station. System 18 may be an example of system 2 shown in FIG. 1.

In the example shown in FIG. 2, system 8 includes an aircraft 20, one or more other aircraft or vehicles 22, and one or more ground-based systems 24. For simplicity and not to be meant as limiting, FIG. 2 is discussed herein as having a single aircraft 20, a single aircraft 22, and a single ground-based system 24. However, in other examples, system 18 can include other numbers of aircraft 22 and ground-based systems 24. Weather data can be collected by one or more of aircraft 20, aircraft 22, and ground-based system 24. Each of aircraft 20 and other aircraft or vehicles 22 may be a piloted aerial vehicle (e.g., a commercial airliner), helicopter, an autonomous aerial vehicle, a satellite, or other type of vehicle.

Aircraft 20 includes a processor 26, a display or user interface 30, one or more communications system 32, a memory 34, one or more data sources 38 (e.g., global positioning system (GPS), inertial sensors, air data sensors, and the like), one or more output devices 40, and one or more detection and ranging systems 42. As shown in FIG. 2, these components are located on aircraft 20. However, in some examples, some of these components are not located onboard aircraft 20. For example, one or more of processor 26, user interface 30, communications system 32, memory 34, and data sources 38 may be located external to aircraft 20. Some of these components may be located external to aircraft 20, such as in an air traffic control center or another ground control center, such as ground-based system 24. For example, a processor may be located external to aircraft 20 and may perform any part of the functions attributed to processor 26 herein. For example, the processor located external to aircraft 20 may be configured to processor, aggregate, and/or distribute weather data based on data received from data sources 38 onboard aircraft 20, as well as data sources (e.g., other aircraft 22 or ground-based systems 24, or both) external to aircraft 20.

Ground-based system 24, which can be, for example, a ground station, includes memory 43 (which stores weather database 44), processor 46, and communications system 48. Although not shown in FIG. 2, other aircraft 22 may be configured similarly to aircraft 20.

Processors 26, 46, as well as other processors disclosed herein, can each comprise any suitable arrangement of hardware, software, firmware, or any combination thereof, to perform the techniques attributed to the respective processor 26, 46 herein. For example, processors 26, 46 may each include any one or more microprocessors, digital signal processors (DSPs), application specific integrated circuits (ASICs), field programmable gate arrays (FPGAs), or any other equivalent integrated or discrete logic circuitry, as well as any combinations of such components. Memories 34, 43 can each include any volatile or non-volatile media, such as a RAM, ROM, non-volatile RAM (NVRAM), electrically erasable programmable ROM (EEPROM), flash memory, and the like. Memories 34, 43 may store computer readable instructions that, when executed by the respective processor 26, 46, cause the processor to the techniques attributed to the processor herein.

User interface 30 is configured to deliver weather information (generated based on weather data) to a user, who may be a part of a crew in a flight deck of aircraft 20 or may be located remotely from aircraft 20. User interface 30 may comprise one or more of headphones, a speaker, a visual display, or a tactile device. For example, user interface 30 can include one or more of a display screen (e.g., a liquid crystal display (LCD) or a light emitting diode (LED) display) configured to present information to the user, a speaker configured to deliver an audible weather update, or a sensory device configured to deliver a somatosensory weather update. The display can include, for example, an electronic flight bag (EFB), a primary flight display (PFD), a multifunction display (MFD), a navigation display, or any other suitable display. In some examples, the display may be a touch screen display. In addition, user interface 30 can include one or more of a keypad, buttons, a peripheral pointing device or another input mechanism that allows the user to provide input.

Processor 26 is configured to send and receive information over a data channel via communications system 32, which may include a transceiver (e.g., a receiver and/or a transmitter). For example, processor 26 may be configured to send, receive, or both send and receive data from data sources external to aircraft 20, such as from other vehicles 22 and ground-based system 24. The data received by processor 26 can include, for example, weather data indicative of atmospheric conditions including weather events. Examples of data that can be received from sources external to aircraft 20 include, but are not limited to, data indicating the location and, in some cases, the velocity (e.g., speed and direction), of other aircraft in the air, and weather information collected from other sources (e.g., one or more other aircraft 22 or ground-based systems 24).

Communication system 32 may be configured to communicate with ground-based system 24, other aircraft 22, or both, by way of any suitable datalink, such as, but not limited to, a very high frequency (VHF) spectrum datalink (e.g., about 30 megahertz to about 300 megahertz), a datalink provided by a satellite, a cellular datalink, or other air/ground datalinks. Communication system 48 of ground-based system 24 may be similar to communication system 32.

Processor 26 is also configured to receive data from, and, in some cases, control, one or more data sources 38 onboard aircraft 20. The communicative coupling between processor 26 and one more data sources 38 may be, for example, a data bus. The input from one or more data sources 38 may also be stored in memory 34 in some examples. Different input may be stored in memory 34 so as to define different types of weather or atmospheric parameters or different types of input, and processor 26 may be configured to interpret data in memory 34 as being indicative of different weather information.

One or more data sources 38 are configured to generate data from which processor 26 may determine weather conditions in the atmosphere surrounding or in front of aircraft 20. Thus, processor 26 may determine atmospheric conditions for aircraft 20 based on data from one or more data sources 38. For example, one or more data sources 38 may be configured to generate weather data indicative of weather around aircraft 20 or within a detectable range of the one or more data sources 38. The weather data may include, but is not limited to, one or more of data indicative of air temperature, wind direction, relative humidity, air pressure at altitude, wind speed, or other weather parameters. For example, one or more data sources 38 may include a barometric pressure sensor (e.g., a ram air pressure sensor), a temperature sensor, a humidity sensor, one or more cameras, an altitude heading reference system, an infrared radiometry device, a lightening detector, a body motion sensor (e.g., accelerometers), other short-range or long-range sensors that generate signals indicative of weather parameters, or any combination thereof.

One or more data sources 38 may also include sources that determine position information of aircraft 20, including one or more of a GPS, an inertial navigation system (INS), or another positioning system configured to indicate the location of aircraft 20. The location of aircraft 20 indicated by the data from one or more data sources 38 may be the geographic location (e.g., latitude and longitude) of aircraft 20, the location of aircraft 20 relative to one or more landmarks, or any combination thereof. Processor 26 can use the location of aircraft 20 to geo-reference weather data generated by one or more data sources 38. For example, processor 26 can annotate the weather data with information that identifies a location (e.g., latitude, longitude, and altitude) for which the weather data indicates weather and a timestamp that indicates the time for which the weather data was generated. Geo-referenced weather data may be useful for, for example, aggregating and fusing weather data from a plurality of different sources. Processor 26 can be configured to implement any suitable data processing technique to interpret weather data and geo-reference weather data.

In addition, or instead of, the sensors described above, in some examples, one or more data sources 38 include one or more sensors configured to generate information indicative of obstacles near aircraft 20 (e.g., surrounding aircraft 20). The sensors may be located at any suitable place on aircraft 20. In addition, the sensors may be oriented in any suitable direction for detecting weather. The fields of view (FOVs) of the sensors can be selected such that sensors help provide weather information along a flight path of aircraft 20. In addition, the sensors can have any sensor range suitable for providing a pilot with advanced notice of weather, e.g., before aircraft 20 encounters the weather. An example of a sensor configured to generate information indicative of obstacles near aircraft 20 includes a camera. In examples in which the one or more sensors of data sources 38 include one or more cameras, processor 26 may be configured to receive images captured by the one or more cameras and process the images to detect specific atmospheric conditions and/or weather events.

Another example of sensor configured to generate information indicative of obstacles near aircraft 20 (e.g., surrounding aircraft 20) is detection and ranging systems 42. Detection and ranging system 42 may be, for example, a radar system or a LIDAR (light detection and ranging) system. Detection and ranging system 42 includes any devices and components necessary to perform remote sensing, such as one or more antennas. Processor 26 is configured to remotely sense distances to a target (such as a weather cell, turbulence, object, or terrain)) by at least controlling system 42 to generate and transmit waves (such as electromagnetic waves, for example, radio waves) and analyzing the resulting backscatter radiation. For example, processor 26 can be configured to determine the location (e.g., coordinates or location relative to aircraft 20) of a weather cell based on radar return pulses. Detection and ranging system 42 is configured to scan one or more volumes of three dimensional space for weather and provide data related to the distance and bearing of one or more weather events to processor 26.

In addition to generating data indicative of precipitation such as rain, snow or hail, the data generated by detection and ranging system 42 may he used by processor 26 to detect other weather phenomena, such as turbulence, lightning, and wind shear, for example. In some examples, detection and ranging system 42 is configured to obtain long range sensor data. For example, detection and ranging system 42 including a long range radar sensor may obtain weather data far from aircraft 20, for example, within approximately 350 nautical miles of aircraft 20.

Detection and ranging system 42 may include any suitable type of system, such as, for example, scanning X or S-band weather radar systems. Various examples of detection and ranging system 42. may use one or more antennas, various configurations of the one or more antennas, and different frequencies. One or more frequencies used in detection and ranging system 42 may be selected for a desired obstacle resolution and stealth.

Processor 26 may receive data from one or more data sources 38 and data (e.g., radar return data) from detection and ranging system 42, and store the data as weather data in memory 34. In some examples, processor 12 may translate the received data for storage in a three-dimensional (3D) buffer in memory 34. For example, detection and ranging system 42 may be configured scan the entire 3D space in front of aircraft 20, and processor 26 may store all reflectivity data in an earth-referenced 3D for ("volumetric") memory buffer. Processor 26 can update the buffer with reflectivity data from new scans.

In addition to, or instead of memory 34 onboard aircraft 20, weather data can be stored by a device external to aircraft 20 and accessible to processor 26 via, e.g., a communication system 22, which can be any suitable datalink.

Processor 26 is configured to receive weather data from data sources 38 and detecting and ranging system 42. Processor 26 may also receive weather data from one or more entities other than aircraft 20, such as from other aircraft 22 and one or more ground-based system 24, via communications system 32. If weather data is received from multiple sources, processor 26 may aggregate the weather data into a combined set of weather data. In addition, processor 26 may determine weather conditions based on the received weather data, and control user interface 30 to generate a graphical user interface that presents information regarding the determined weather conditions.

User interface 30 may also be configured to receive a request for weather data for a specified region of interest. For example, a user may provide input to user interface 30 that requests weather data for certain volumes of space (e.g., along a flight path of aircraft 20), The request may also include a specific time range, altitude levels, and the like. Processor 26 may receive the request input into user interface 30 and transmit the request to another entity, such as ground-based system 24, one or more other aircraft 22, or both. In response to receiving the request, the entity may transmit the requested weather data to aircraft 20.

Processor 26 may also be configured to automatically request weather data from one or more entities in the absence of user input. For example, processor 26 may determine regions where additional weather data from sources besides aircraft 20 may be desirable. As an example, processor 26 may determine that the onboard data sources 38 or system 42 are unable to provide sufficient weather data fora particular region of interest along the flight path of aircraft 20, the flight path being determined, e.g., based on a flight management system of aircraft 20. In response to determining a region of interest where additional weather data may be desirable, processor 26 may generate a request for weather data for the region of interest. Processor 26 may control communication system 32 to downlink the request to another entity, such as another aircraft 22 or a ground-based system 24. Processor 26 may determine when to transmit the request based on some considerations (e.g., how much bandwidth is available at a given time, a cost of the data transfer, and the like).

Processor 26 is also configured to receive, via communications system 32, requests for weather data for a particular region of interest from another entity, such as ground-based system 24, one or more other aircraft 22, or both. In response to receive the request for weather data, processor 26 may retrieve the weather data from memory 34 and transmit the requested weather data to the requesting entity via communications system 32. The weather data can be weather data generated by data sources 38 and/or detection and ranging system 42 of aircraft 20. Thus, the weather data can be weather data indicative of weather proximate aircraft 20. In examples in which the stored weather data is geo-referenced, processor 26 may retrieve the requested weather data from memory 34 based on the specified region of interest.

The datalinks available for aircraft 20 may be expensive to use. In some examples, in order to reduce costs, processor 26 only transmits weather data to another entity upon request from the entity. In some examples, processor 26 only transmits weather data to entities that subscribe to a weather update service.

In some examples, processor 46 of ground-based system 24 is configured to transmit, via communications system 48, requests for weather data to one or more entities, such as aircraft 20 or other aircraft or vehicles 22, as described above with respect to ground station 14 (FIG. 1), and receive the requested weather data from the one or more entities. Processor 46 may store received weather data for one or more geographical regions over different time periods in weather database 44. In some examples, weather database 44 includes historical weather data for a region.

Figure 3:
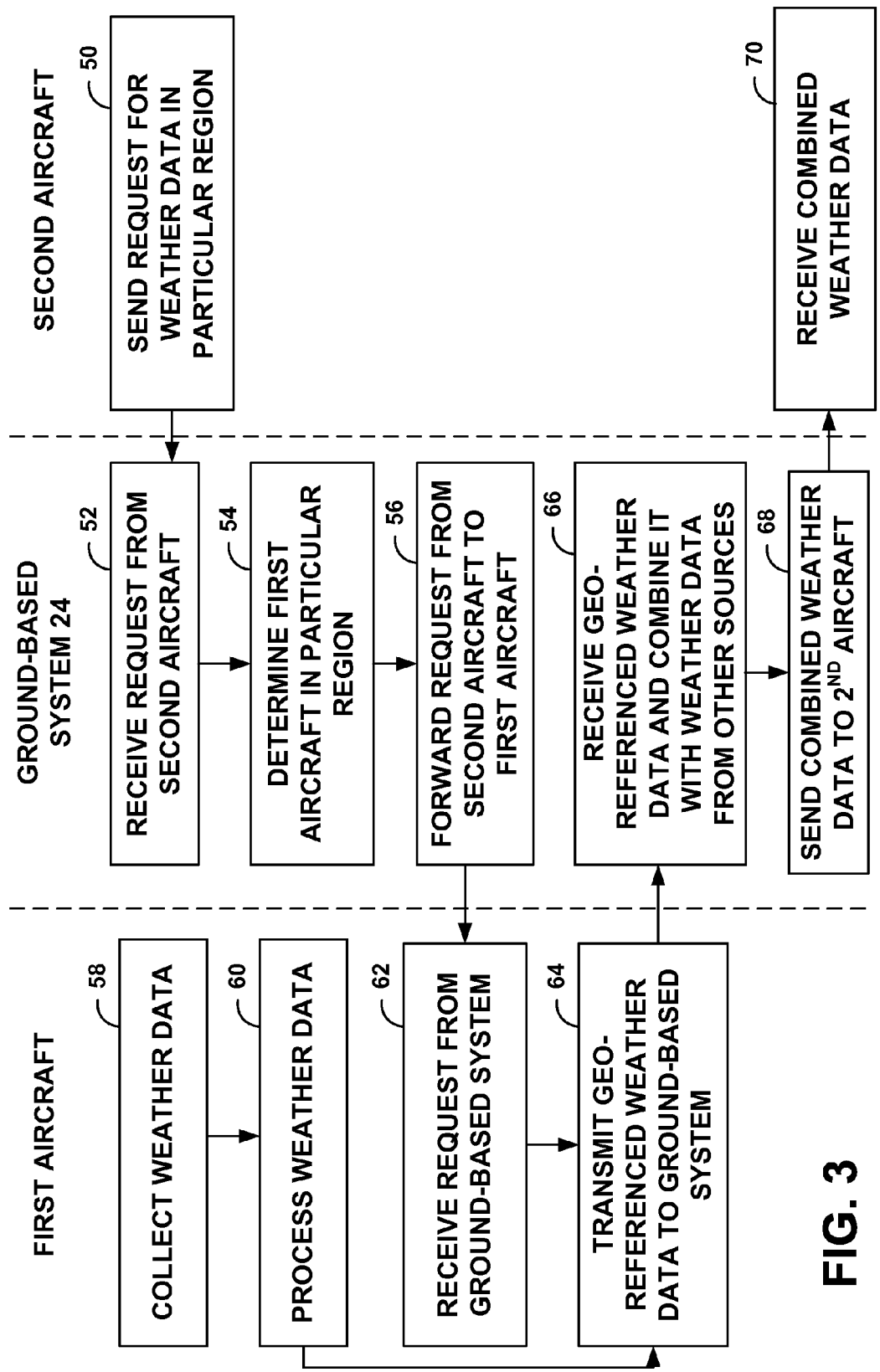
FIG. 3 is a conceptual diagram illustrating an example process for an entity requesting weather data for a region of interest to receive the requested weather data from another entity.

System 18 shown in FIG. 2 is one example of a system for gathering, processing, and sharing weather data between one or more aircraft 20 and 22 as well as one or more ground-based systems 24. In other examples, the techniques described herein for requesting weather data and responding to requests for weather data may be used with other systems. Any suitable algorithms may be used by an entity to request weather data, process collected weather data, aggregate weather data from among different sources, and respond to requests for weather data, FIG. 3 is a diagram illustrating an example process by which an entity requesting weather data for a particular region of interest receives the requested weather data from another entity. In the example shown in FIG. 3, the requesting entity is aircraft 22 or ground-based system 24, and the entity providing the weather data is aircraft 20. Ground-based system 24 forwards a request for weather data from requesting aircraft 22 (e.g., "second aircraft") to another aircraft 20 (e.g., "first aircraft"). FIG. 3 is merely one example process of aggregating and sharing weather data. As discussed herein, the process is described with respect to system 18 of FIG. 2. However, the process may apply to other example systems as well.

Second aircraft 22 may be scheduled to fly in a specific region. Crewmembers of aircraft 22, such as a pilot, may wish to get updated or current weather information regarding that region before aircraft 20 encounters the region.

Thus, a processor of second aircraft 22, using a communications system, transmits, to ground-based system 24, a request for weather data in the particular region (50). The request may also specify a time period to which the weather data should correspond. In some examples, the processor of second aircraft 22 automatically transmits the request for weather data, while in other examples, the processor of second aircraft 22 transmits the request for weather data in response to receiving user input via a user interface Processor 46 of ground-based system 24 receives the request from aircraft 20 (52). Processor 46 determines one or more aircraft that may be capable of obtaining weather data for the particular region identified in the request (54). The determination may be based on radar detecting particular aircraft located in the particular region, flight plans that identify aircraft scheduled to travel through or near the particular region, or from other sources. After processor 46 identifies an aircraft, such as first aircraft 20 in this example, as capable of obtaining the desired weather data, processor 46 forwards the request for the particular weather data from aircraft 22 to first aircraft 22 (56). In some examples, processor 46 generates a new request to send to aircraft 20.

Meanwhile, processor 26 of aircraft 20 may have been collecting weather data (58) and processing the weather data (60) for use onboard aircraft 20. Processor 26 may not automatically send the collected or processed weather data to ground-based system 24. Instead, processor 26 may only transmit the weather data to ground-bases system 24 in response to receiving the request for weather data corresponding to the particular region of interest from ground-based system 24 (62) or upon some other pre-defined event, such as location or passage of time. Processor 26 may determine the weather data corresponding to the particular region, e.g., by selecting the weather data from memory 34 (FIG. 2). In some examples, processor 26 also geo-references the weather data such that the location and a time stamp of the weather data is identified. Processor 26 may then transmit the geo-referenced weather data to ground-based system 24 via communications system 32 (64).

Processor 46 of ground-based system 24 receives the geo-referenced weather data from aircraft 20 and combines it with weather data for the region from other sources (66). The other sources may include, for example, other aircraft, satellite 4, ground-based weather instrumentation 6, or any combination thereof. In some examples, the weather data for the region from the other sources may be stored by weather database 44. In some examples, processor 46 does not combine the geo-referenced weather data with any other data. Processor 46 transmits, via communication system 48 (FIG. 3), the weather data to other aircraft 22 (68). In sonic examples, processor 46 only provides the weather data to aircraft 22 only in response to determining aircraft 22 subscribes to an updated weather service.

Aircraft 22 receives the combined weather data or geo-referenced weather data (70). A weather system of aircraft 22 may use the received weather data to update a weather display of aircraft 22.

Figure 4:
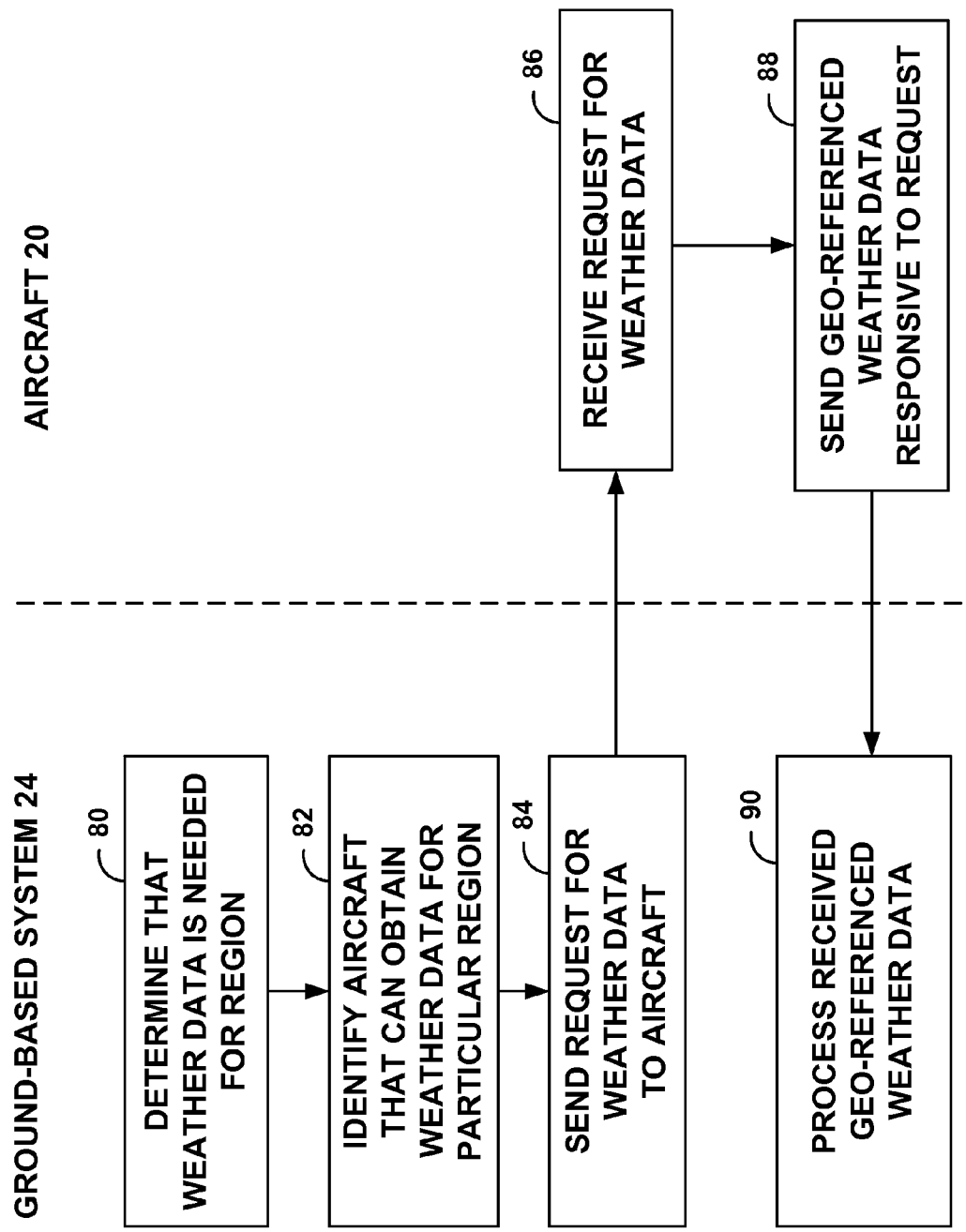
FIG. 4 is a conceptual diagram illustrating an example process for an entity to request weather data from another entity.

FIG. 4 is a conceptual diagram illustrating another example process by which an entity requests weather data from another entity and receives the requested weather data. In the example of FIG. 4, ground-based system 24 requests aircraft 20 to provide weather data. FIG. 4 is merely one example process of aggregating and sharing weather data. As discussed herein, the process is described with respect to system 18 of FIG. 2. However, the process may apply to other example systems as well.

In the example of FIG. 4, processor 46 of ground-based system 24 determines that weather data is needed for a particular region (80). The weather data may also be needed for a particular time. Ground-based system 24 may need the weather data because it does not have access to any weather data for the particular region at that time, because it received a specific request for the weather data from another entity, or for another reason. Processor 46 identifies an aircraft that can obtain weather data for the particular region (82). Processor 46 may identify an aircraft, such as aircraft 20, that can obtain the desired data based on, for example, a known position of aircraft 20 and a knowledge of the sensors onboard aircraft 20 and a range of those sensors.

Processor 46 transmits, via communications system 48, a request for weather data to aircraft 20 (84). Processor 26 of aircraft 20 receives the request for weather data (86). In response to receiving the request for weather data (via communication system 32), processor 26 obtains the weather data using one or more sensors onboard aircraft 20, if the weather data has not already been obtained, from memory 34, or both. Processor 26 may geo-reference the weather data. Processor 26 transmits, via communications system 32, the geo-referenced weather data to the requesting entity, i.e., ground-based system 24 in the example shown in FIG. 4 (88). Processor 26 may send the geo-referenced weather data over a datalink using a satcom system. In some examples, processor 46 of ground-based system 26 geo-references the weather data based on a known location of aircraft 20.

Processor 46 of ground-based system 24 processes the received geo-referenced weather data (90), e.g., by fusing or aggregating the weather data with other weather data stored by weather database 44, or other weather data received from other sources. For example, processor 46 may geo-reference multiple sets of weather data and stitch the data together. In some examples, processor 46 of ground-based system 24 transmits the resulting weather data to another entity, such as aircraft that subscribe to a weather update system. In additional examples, processor 46 may provide the resulting weather data to other users, such as weather or meteorological forecasters. Any suitable communication protocol may be used to provide the weather data from ground-based station 24 to other ground-based users, including, but not limited to the internet.

Figure 5:
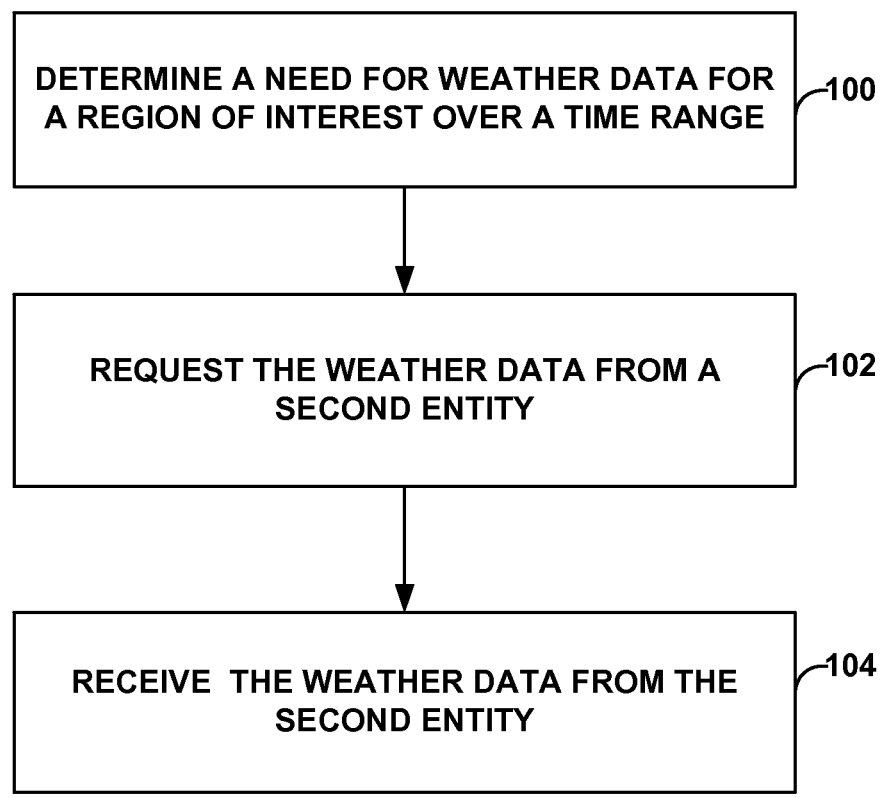
FIG. 5 is a flow diagram illustrating an example method of disseminating weather data.

FIG. 5 is a flowchart, illustrating an example technique, performed by a first entity, for receiving weather data from a second entity. As discussed herein, the technique is described with respect to system 18 of FIG. 2 and is described such that aircraft 20 is the first entity. However, the technique may apply to other example systems as well.

In the technique shown in FIG. 5, processor 26 of aircraft 20 determines a need for weather data for a region of interest over a particular time range (100). The time range may be, for example, a time range that would provide weather data relevant to the flight of aircraft 20 through the region of interest. Processor 26 may request the weather data from a second entity (102), which can be, for example, ground-based station 24 or another aircraft 22. For example, processor 26 may determine that a particular aircraft is capable of providing the weather data corresponding to the region of interest and the relevant time range based on flight schedules including the other aircraft, a known position of the other aircraft, and ranges of sensors onboard the other aircraft, and transmit the request for weather data to the identified aircraft.

Responsive to the request, the second entity sends the corresponding weather data to aircraft 20. Processor 26 receives the weather data from the second entity, wherein the weather data can be geo-referenced weather data (104). The geo-referenced weather data may include information identifying a location of the weather data and a time stamp of the weather data. In some examples, the weather data is not geo-referenced or only a subset is geo-referenced. In some examples, processor 26 of aircraft 20 only receives weather data from the second entity responsive to the processor of the first entity requesting the weather data.

In some examples, processor 26 combines the received geo-referenced weather data with a set of weather data determined from a source other than the second entity, such as weather data from ground-based system 24, satellite 4 (FIG. 1) or ground-based instrumentation 6 (FIG. 1).

In one example, a computer-readable storage medium having stored thereon instructions is described. When executed, the instructions cause a processor of a first entity to determine a need for weather data for a location over a time range, request weather data corresponding to the location over the time range from a second entity, and receive the weather data from the second entity, wherein the weather data is geo-referenced weather data.

In some geographic regions, such as oceanic regions outside developed countries' land mass, there can be poor weather radar coverage. In techniques and systems described herein, aircraft that carry their own weather radar data for their own use may share this weather data information with other entities. An onboard aggregation of weather radar imagery and data, as well as weather data from other onboard sensors, and aircraft information (e.g., location), may be combined and sent to the other entities. In addition, or instead, a ground-based system may receive weather data from one or more sources, aggregate the weather data, and disseminate the weather data to one or more aircraft. In some examples, the ground-based system may be a world-wide system that is capable of sending weather data from aircraft all over the world to other entities.

Furthermore, in some examples, techniques, devices, and systems described herein may save costs on communications, because only requested (e.g., needed) weather data would be exchanged between aircraft and ground-based systems. For example, an aircraft can be configured to respond to polling for specific weather related data elements (either individually or by geographic region) for either textual or graphical information from the flight deck rather than just have the aircraft continuously push information, which is the current industry practice. The determination of which aircraft to request information from and which data links to use can be based on various conditions such as predicted or measured weather conditions in a region and planned routes of flights in a region to optimize the weather coverage at lowest communication cost.

The techniques of this disclosure may be implemented in a wide variety of computer devices. Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed by one or more processors, performs one or more of the methods described above. The one or more processors can be, for example, one or more digital signal processors (DSPs), general purpose microprocessors, application specific integrated circuits (ASICs), field programmable logic arrays (FPGAs), or other equivalent integrated or discrete logic circuitry. The computer-readable medium may comprise a tangible computer-readable storage medium and may form part of a larger product. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other nonvolatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

Various aspects of the disclosure have been described. Aspects or features of examples described herein may be combined with any other aspect or feature described in another example. These and other examples are within the scope of the following claims.

What is claimed is:

1. A method comprising:
    requesting, by a processor of an entity, weather data corresponding to a region of interest from a first system onboard a first aircraft;
    receiving, by the processor of the entity, the weather data from the first system onboard the first aircraft, wherein the first system onboard the first aircraft only transmits the weather data to the entity in response to receiving a request for the weather data from the entity;
    receiving, by the processor of the entity, from a second system onboard a second aircraft, a request for the weather data corresponding to the region of interest; and
    transmitting, by the processor of the entity, in response to the request from the second system onboard the second aircraft, the weather data corresponding to the region of interest received from the first system onboard the first aircraft to the second system onboard the second aircraft.

2. The method of claim 1, wherein the entity comprises a third system onboard a third aircraft.

3. The method of claim 1, wherein the entity comprises a ground station.

4. The method of claim 1, further comprising, prior to requesting the weather data from the first system onboard the first aircraft, determining, by the processor of the entity, that the first system is capable of obtaining weather data corresponding to the region of interest.

5. The method of claim 1, further comprising combining the weather data from the first system onboard the first aircraft with a set of weather data determined from a source other than the first system onboard the first aircraft.

6. The method of claim 1, further comprising sending, by the processor of the entity, the weather data to one or more additional entities that have a subscription for receiving weather data.

7. The method of claim 1, further comprising:
determining, by the processor of the entity, the region of interest based on a flight plan of the second aircraft;
identifying, by the processor of the entity, an aircraft that can provide the weather data for the determined region of interest, as the first aircraft, prior to requesting the weather data corresponding to the region of interest from the first system onboard the first aircraft; and
transmitting, by the processor of the entity, the weather data for the region of interest determined based on the flight plan of the second aircraft, received from the first system onboard the first aircraft to the second system onboard the second aircraft.

8. A requesting system comprising:
a communications system; and
a processor configured to:
transmit a request, via the communications system, for weather data corresponding to a region of interest from a first system onboard a first aircraft, and receive, via the communications system, the weather data from the first system onboard the first aircraft, wherein the processor only receives weather data from the first system onboard the first aircraft in response to transmitting the request for the weather data;
receive, via the communications system, from a second system onboard a second aircraft, a request for the weather data corresponding to the region of interest; and
transmit, via the communications system, in response to the request from the second system onboard the second aircraft, the weather data corresponding to the region of interest received from the first system onboard the first aircraft to the second system onboard the second aircraft.

9. The requesting system of claim 8, wherein the processor is further configured to, prior to requesting the weather data from the first system onboard the first aircraft, determine that the first system onboard the first aircraft is capable of obtaining weather data corresponding to the region of interest.

10. The requesting system of claim 8, wherein the processor is further configured to combine the weather data received from the first system onboard the first aircraft with weather data determined from a source other than the first system onboard the first aircraft and transmit the combined weather data to another entity.

11. The requesting system of claim 8, wherein the requesting system is a ground-based system, wherein the processor is further configured to:
identify the first system onboard the first aircraft as being capable of obtaining weather data for the region of interest,
determine that one or more other aircraft will be encountering the region of interest, and transmit the weather data received from the first system onboard the first aircraft to the one or more other aircraft in response to determining that the one or more other aircraft will be encountering the region of interest.

12. The requesting system of claim 8, wherein the processor is further configured to use the weather data corresponding to the region of interest from the first system onboard the first aircraft to determine a flight path for the second aircraft.

13. The requesting system of claim 8, wherein the processor is further configured to:
request weather data corresponding to the region of interest from a third system onboard a marine vessel;
combine the weather data from the first system onboard the first aircraft with the weather data corresponding to the region of interest from the third system onboard the marine vessel; and
transmit, in response to the request from the second system onboard the second aircraft, the combined weather data received from the first system onboard the first aircraft and the weather data from the third system onboard the marine vessel to the second system onboard the second aircraft.

14. The requesting system of claim 8, wherein the processor is further configured to:
request weather data corresponding to the region of interest from a third system onboard a ground-based vehicle;
combine the weather data from the first system onboard the first aircraft with the weather data corresponding to the region of interest from the third system onboard the ground-based vehicle; and
transmit, in response to the request from the second system onboard the second aircraft, the combined weather data received from the first system onboard the first aircraft and the weather data from the third system onboard the ground-based vehicle to the second system onboard the second aircraft.

15. A system onboard a first aircraft, the system comprising:
at least one sensor;
a communications system; and
a processor configured to:
receive a request, via the communications system, from a requesting entity, for weather data corresponding to a region of interest,
geo-reference the weather data, wherein the geo-referenced weather data identifies a location of the weather data and a time stamp indicating a time for which the weather data was generated, and
transmit, via the communications system, the weather data corresponding to the region of interest to the requesting entity, wherein the weather data is generated by the at least one sensor, wherein the processor is configured to transmit the weather data to the requesting entity only in response to receiving the request.

16. The system of claim 15, further comprising a memory that stores the weather data, wherein the processor retrieves the weather data from the memory prior to transmitting the weather data to the requesting entity.

17. The system of claim 15, further comprising the aircraft, wherein the aircraft comprises the at least one sensor, the communications systems, and the processor.

18. The system of claim 15, wherein the weather data comprises one or more of air temperature, pressure, wind direction, relative humidity, wind speed, wind shear, an indication of hail, a presence of turbulence, an indication of lightening, or an indication of precipitation.

* * * * *